(12) United States Patent
Lebot et al.

(10) Patent No.: US 7,497,639 B2
(45) Date of Patent: Mar. 3, 2009

(54) INSERT IN THE FORM OF A THREADED BUSHING, WHICH IS DESIGNED TO EQUIP AND FIX PLATES, FOR EXAMPLE, GLASS PLATES, AND PLATES THUS EQUIPPED

(75) Inventors: Pierre Lebot, Toulouse (FR);
Jean-Clement Nugue, Lamorlaye (FR);
Francoise Mennechez, Paris (FR)

(73) Assignee: Saint-Gobain Glass France, Courbevoie (FR)

( * ) Notice: Subject to any disclaimer, the term of this patent is extended or adjusted under 35 U.S.C. 154(b) by 184 days.

(21) Appl. No.: 10/534,969

(22) PCT Filed: Nov. 17, 2003

(86) PCT No.: PCT/FR03/03402

§ 371 (c)(1),
(2), (4) Date: Oct. 31, 2005

(87) PCT Pub. No.: WO2004/046567

PCT Pub. Date: Jun. 3, 2004

(65) Prior Publication Data

US 2006/0147292 A1      Jul. 6, 2006

(30) Foreign Application Priority Data

Nov. 18, 2002   (FR)   .................................. 02 14517

(51) Int. Cl.
*F16C 11/00*   (2006.01)

(52) U.S. Cl. .................. 403/277; 403/131; 403/142
(58) Field of Classification Search ............. 403/11–22, 403/200, 277, 122–144; 411/182, 270, 267, 411/433, 437
See application file for complete search history.

(56) References Cited

U.S. PATENT DOCUMENTS

| | | | |
|---|---|---|---|
| 3,310,993 A | * | 3/1967 | Kimberlin et al. |
| 3,476,010 A | * | 11/1969 | Markey .......................... 411/9 |
| 5,106,250 A | * | 4/1992 | Fischer et al. ................ 411/107 |
| 5,718,547 A | | 2/1998 | Eischeid |
| 6,146,383 A | * | 11/2000 | Studer et al. |
| 2002/0020119 A1 | | 2/2002 | Oberhofer et al. |

FOREIGN PATENT DOCUMENTS

| | | |
|---|---|---|
| EP | 0 340 089 | 11/1989 |
| EP | 0 931 942 | 7/1999 |
| WO | 01/09459 | 2/2001 |

* cited by examiner

*Primary Examiner*—Victor MacArthur
(74) *Attorney, Agent, or Firm*—Oblon, Spivak, McClelland, Maier & Neustadt, P.C.

(57) ABSTRACT

An insert configured to be received or formed in a glass plate to allow, in cooperation with a connecting element, the glass plate to be mounted on a support. The insert is designed to be received in a hole made in one face of the plate, the hole being bounded by a retaining side wall of curved profile directed toward the inside. The insert includes a fastening mechanism complementary to a mechanism carried by the connecting element for connecting the plate to the support.

6 Claims, 4 Drawing Sheets

INSERT IN THE FORM OF A THREADED BUSHING, WHICH IS DESIGNED TO EQUIP AND FIX PLATES, FOR EXAMPLE, GLASS PLATES, AND PLATES THUS EQUIPPED

CROSS-REFERENCE TO RELATED APPLICATIONS

The present application is the U.S. counterpart of WO 2004/046567, and in turn claims priority to French application No. 02/14517 filed on Nov. 18, 2002, the entire contents of each of which are hereby incorporated herein by reference.

BACKGROUND OF THE INVENTION

1. Field of The Invention

The present invention relates to plates, especially made of a brittle material of the glass type, which are equipped so as to be fastened to supports via connecting elements.

2. Discussion of The Background

Such plates are intended especially to equip heating means, such as radiators, convectors, etc., without, however, the present invention being limited to such an application. Thus, the fastening of double-glazing or laminated-glass plates may be mentioned, and also the production of walls or of furniture made of glass substrates.

These plates must therefore have holes at the fastening points. The plates may be strengthened, especially by thermally or chemically toughening them, in order to obtain the mechanical strength (and where appropriate the thermal resistance) that is required. The holes must then be made before the heat treatment.

PCT International Application WO-A1-01/09459 discloses a fastening element for double-glazing plates, said element consisting of a threaded bolt having, at a front end thereof, an expansion cone onto which a ring-shaped expansion element is slipped for the purpose of expansion in a hole in the rear glass plate, said hole being back-tapered in the region of its bottom.

Such a device has the drawback that, while the glass plates provided with holes having such back tapers are being heat treated, high stresses are created in the region of the fillet that joins the bottom of these holes to the frustoconical side wall emerging in the surface of the glass plate and flaring out toward the bottom of the holes. These high stresses may result in defective plates that have to be scrapped after the heat treatment or in which, while they are being mounted or subsequent to their use, faults are developed such as cracks.

Another drawback of this known arrangement is that, once the plate has been mounted, it is only with very great difficulty that it can be demounted, with a high risk of damaging or even breaking it.

SUMMARY OF THE INVENTION

The present invention remedies these drawbacks and provides a fastening system comprising inserts that are intended to receive fastening elements proper, said inserts being designed to be received or formed in situ in holes whose retaining side wall is of curved profile and no longer frustoconical. Thus, for the same cavity volume as in the prior art of the aforementioned technique, the contact or bearing area of the mounting member, that the insert constitutes, will be larger, and this allows the forces to be better distributed.

For this purpose, the subject of the present invention is an insert intended to cooperate in a plate, especially made of a brittle material of the glass type, so as to allow, in cooperation with a connecting element, said plate to be mounted on a support, characterized in that it is designed to be received or formed in situ in a hole having retaining walls of curved profile, said hole being made in one face of the plate.

In preferred embodiments of the invention, one or more of the following provisions may optionally also be employed:
- the hole is bounded by a side wall of concave profile, the concavity being turned toward the inside;
- the hole is a blind hole or a through-hole;
- the hole has a circular or oblong cross section;
- the insert is obtained from at least one component made of a deformable material;
- the insert is removable;
- the insert consists of a cup-shaped element intended to be introduced into the corresponding hole in the plate, said cup having radial slots made in its side wall, thus forming petals that can bend elastically, or even plastically, inward so as to allow said element to be fitted into the corresponding hole in the plate, the internal surface of the side wall of the cuplike element being designed to corporate with the element for connecting it to the support;
- the cuplike element is of circular shape;
- the cuplike element has three to five slots;
- the element has a curved, optionally pierced, bottom;
- the cooperation between the connecting element and the insert is suitable for self-locking said insert within the hole;
- a wetting agent for improving the surface appearance is interposed at the interface between the side wall of the hole and the insert.

The present invention also relates to a plate, especially made of a brittle material of the glass type, having on at least one of its surfaces a hole intended to receive at least one insert as defined above. It also relates to such a plate equipped with its insert or inserts. It also relates to a plate which has been equipped with its insert or inserts and the or each insert of which has received an element for connecting it to a support.

As indicated above, the brittle material of which these plates are made is in general toughened glass, or more generally, a glass substrate that is capable of undergoing a heat treatment, especially a toughening, tempering or annealing treatment, or else a glass that is mechanically reinforced, after the holes have been produced.

The present invention also relates to a mounted assembly or an assembly to be mounted which comprises at least one plate made of brittle material of the glass type, as defined above.

In particular, such an assembly is a heating means comprising a glass plate as defined above, it being possible for said plate to be provided with conducting elements, for example screen-printed elements, and with current leads.

Finally, the present invention relates to a process for manufacturing a plate suitable for being mounted on a support so as to constitute a mounted assembly, such as a heating means, characterized in that the surface of the plate, especially one made of a brittle material of the glass type that has not undergone a heat treatment, is machined so as to make at least one hole at the place of the fastening points, each forementioned hole being shaped so as to allow an insert as defined above to be introduced and retained, in that a heat treatment is then carried out on said plate, and in that an insert of complementary shape as defined above is placed or formed in situ in each of the holes.

To better illustrate the subject of the present invention, one particular embodiment thereof will be described below, by way of indication but implying no limitation, with reference to the appended drawing in which.

DESCRIPTION OF THE PREFERRED EMBODIMENTS

Figure 1:
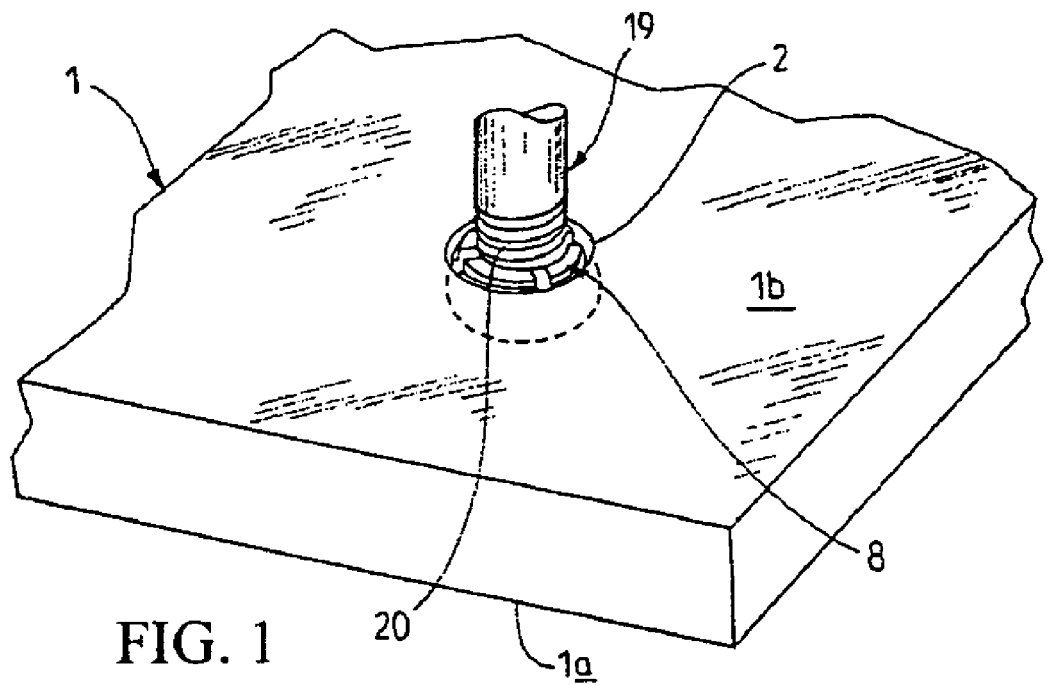
FIG. 1 is a partial view in perspective of a toughened glass plate into which devices for fastening said plate to a support have been fitted, only one of these devices appearing in FIG. 1.
Figure 2:
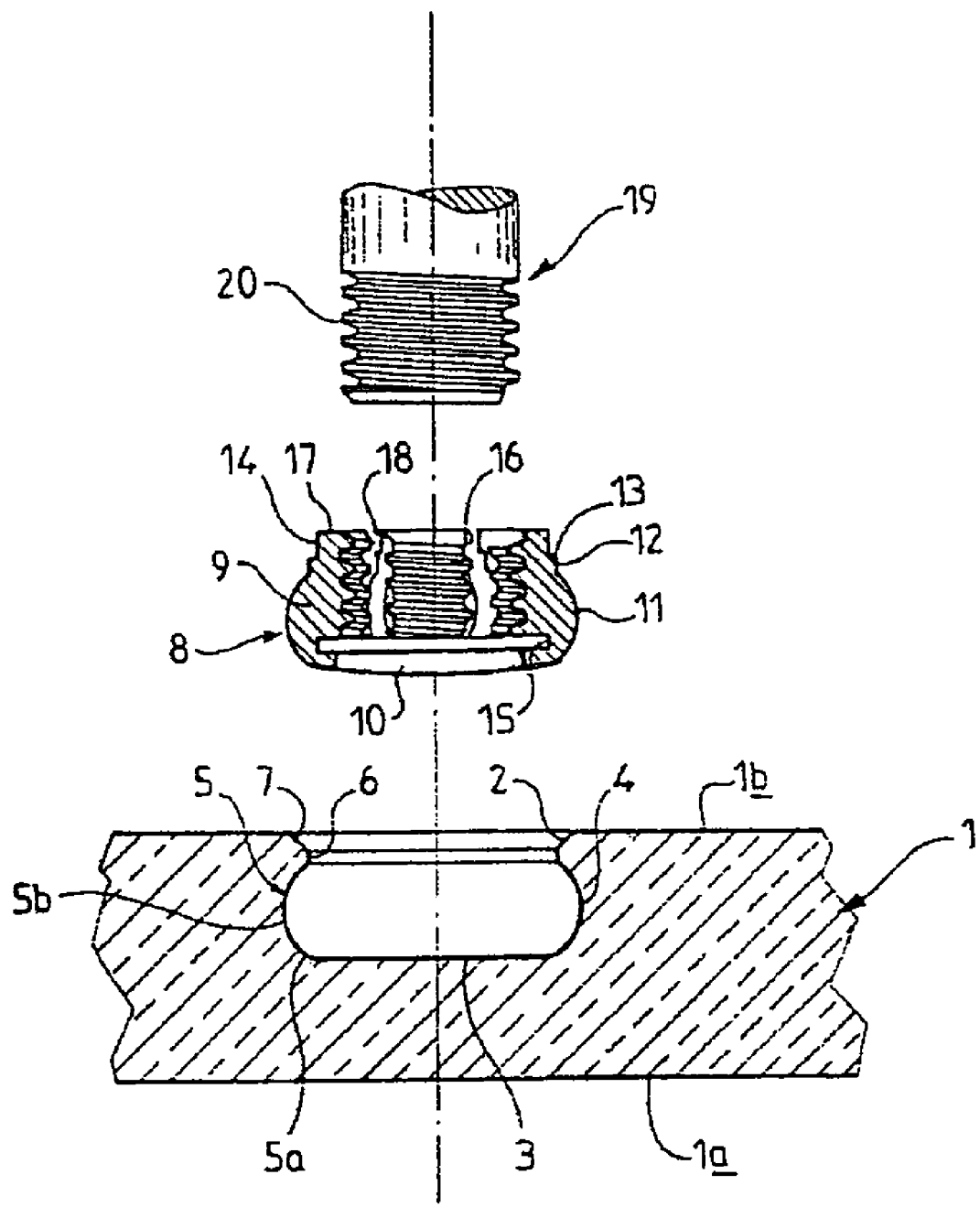
FIG. 2 is an exploded cross-sectional view through the toughened glass plate of FIG. 1 in a diametral plane of the fastening device shown in this figure.

Referring firstly to FIGS. 1 and 2, these show a toughened glass plate 1 that is intended, for example, to constitute the external plate of a heating means, such as a wall convector, a plinth heater, a band heater or a radiant panel.

Figure 4:
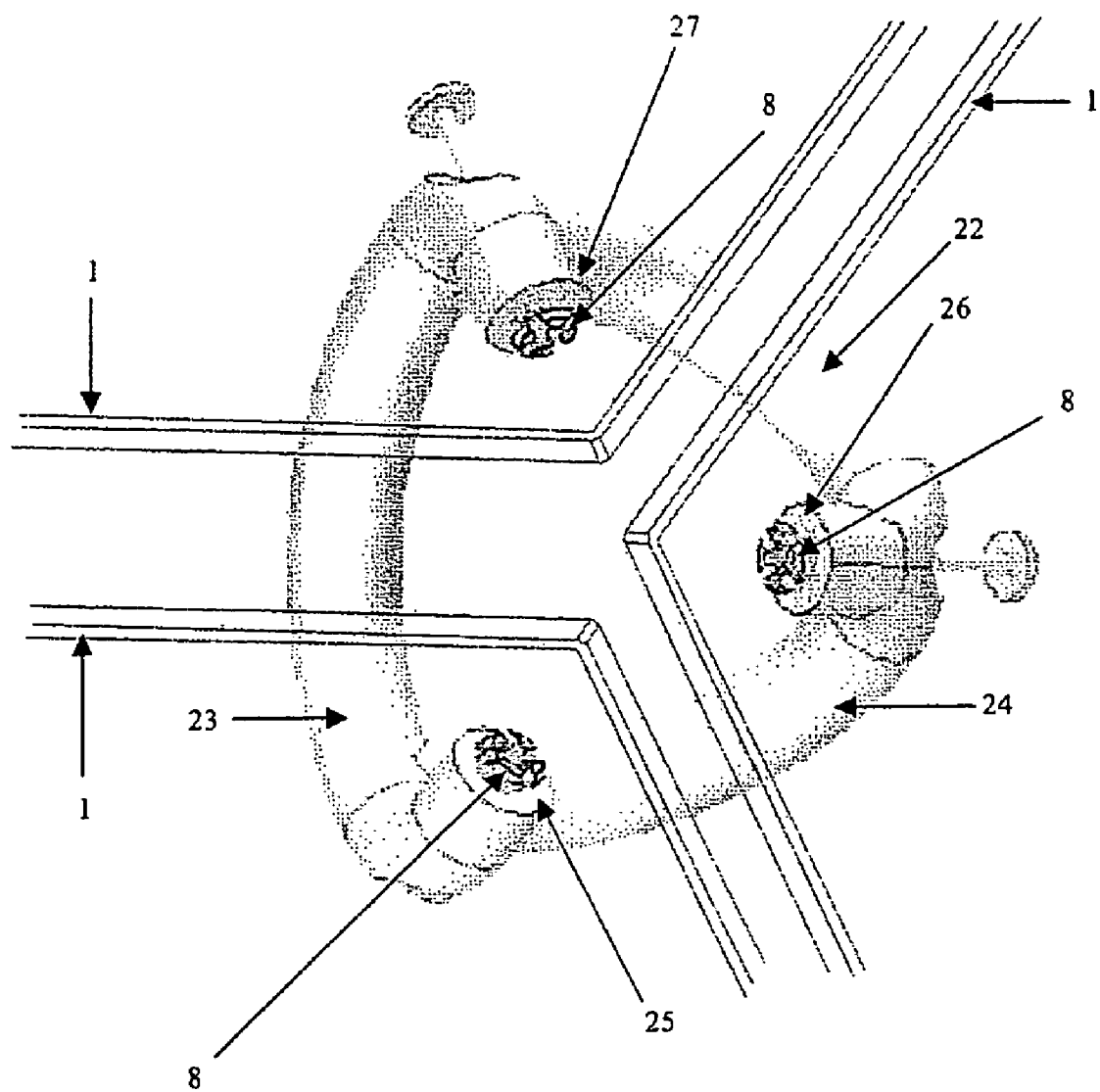
FIG. 4 is a perspective view of a piece of furniture mounted by means of fastening devices that form the subject of the invention.

According to other embodiments, one example of which, specific to furniture, is shown in FIG. 4, this plate, especially made of a brittle material of the glass type, may constitute a wall cladding element, an interior furnishing, a wall or partition, a piece of furniture or any other wall. Connecting elements 22, 23, 24 (e.g., a hinge, spacer, junction or the like, accessory support, etc.) which can be seen in FIG. 4 comprise, at one of their free ends 24, 25, 26, at least one insert 8 according to the invention designed to be mounted within a hole made in said plate, the assembly for mounting the furniture being immobilized by means of the connecting elements 22, 23, 24 and the inserts 8 that connect the components together. Of course, these connecting components may be mounted on the inside and/or on the outside of the furniture.

Figure 5:
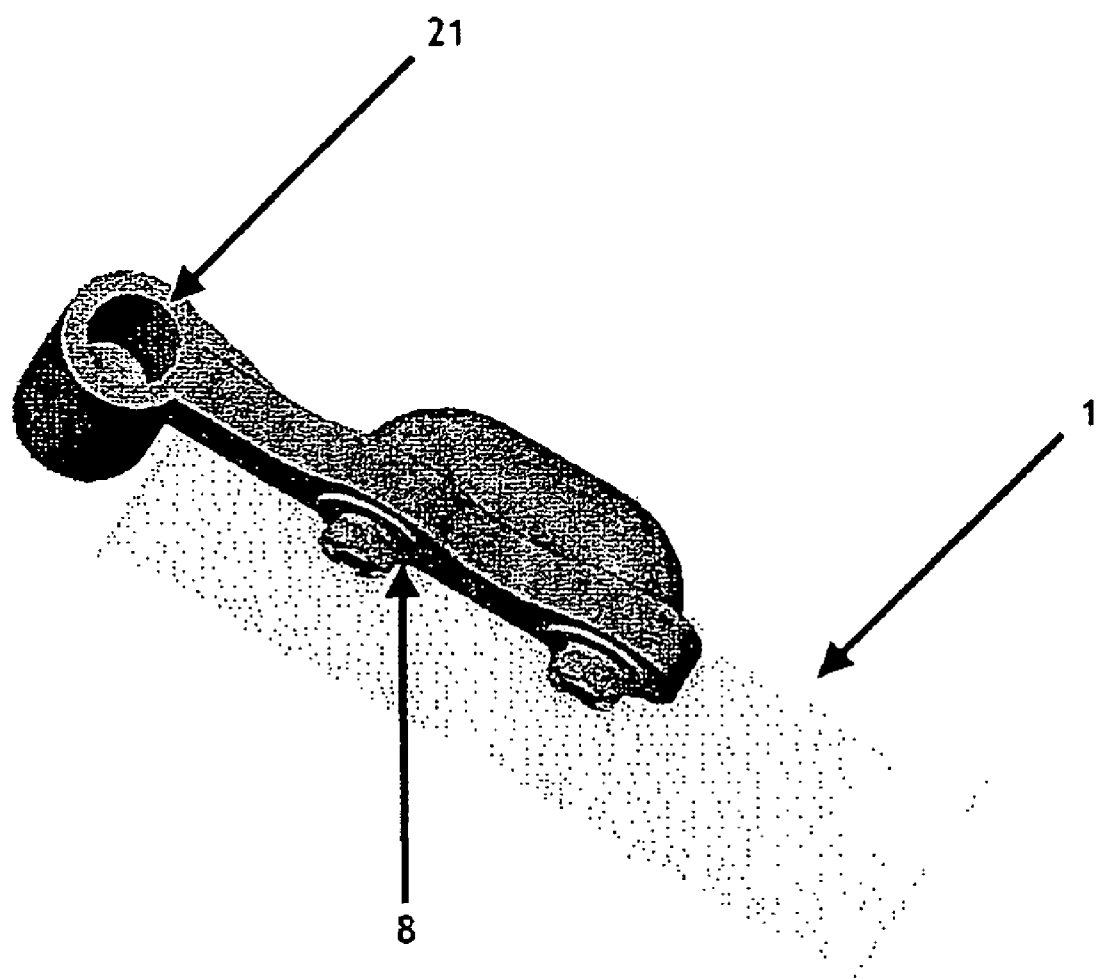
FIG. 5 is a perspective view of a partition or of a wall provided with a hinge, which is mounted on the wall by means of a fastening device forming the subject of the invention.

According to another embodiment example shown in figure 5, the insert 8 forming the subject of the invention allows a hinge 21 to be mounted on a support 1 (a door, partition or the like).

Depending on the case, the toughened glass plate—which is therefore thermally resistant and mechanically strong—is:

a hotplate, for example a plate covered with a transparent electrically conductive coating, which acts as a resistant element in which electricity flowing through it is converted into heat by the Joule effect, thin conductive strips placed along the vertical and/or horizontal borders constituting current lead buses for said electrically conductive coating; this coating is, for example, a low-emissivity infrared-reflective coating, such as a coating of antimony- or fluorine-doped tin, or of tin-doped indium oxide, deposited with a thickness of a few hundred nanometers; or a plate having a coating that reflects infrared radiation, said coating being of the type of low-emissivity coatings mentioned above, or a thin metal coating; or else a protective plate.

It is desired that for this external plate have fastening devices that are carried by its face turned toward the inside in the mounted position of the apparatus, said fastening devices therefore being concealed from view.

The plate 1, of rectangular (or square) shape shown in the drawing, has a face 1a which will be the face presented for view in the final assembly. Made in the corner regions of the face 1b on the opposite side from the face 1a are identical blind holes 2, only one of which may be seen in FIG. 2. Of course, depending on the intended applications, the holes may be through-holes and circular or oblong.

Each of these holes 2 is bounded by a flat circular bottom 3 parallel to the faces 1a, 1b of the glass plate 1 and by a side wall 4 joined to the bottom 3 by a retaining region 5 of curved, especially concave, profile, the concavity of which is turned toward the inside of the hole 2 and has axial symmetry, then a short cylindrical region 6 before emerging at the surface 1b in an outwardly flaring frustoconical region 7. The region 6 thus constitutes, with the neighboring parts of the regions 5 and 7, a catching or retaining bead whose role will be indicated later.

The depth of the hole 2, at the bottom 3, corresponds for example to at most one half of the thickness of the plate 1.

The concave region 5 has in fact a first part 5a having a first radius of curvature $R_1$ and constituting the start of the concavity near the bottom 3, and a second part 5b joining the part 5a and the cylindrical region 6, and having a second radius of curvature $R_2$ that is smaller than the first.

In the example shown, the bottom 3 of a hole 2 has a diameter of 7.6 mm; its height is 1.5 mm and the radii of curvature $R_1$ and $R_2$ are 12 mm and 2 mm respectively. To make it easier to machine the hole, especially at the bottom of the hole, the bottom wall is provided with a radius of curvature $R_3$ of a few tenths of a millimetre.

Figure 3:
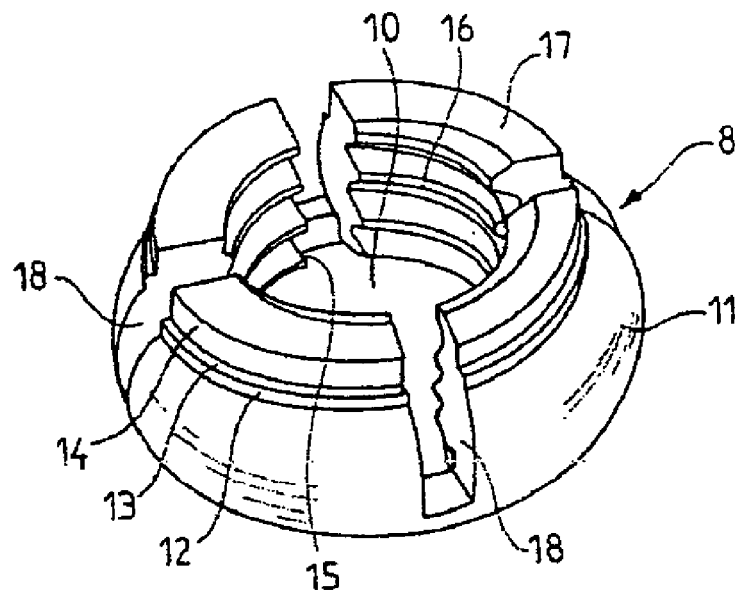
FIG. 3 is, on a larger scale, a perspective view of the insert of the fastening device shown in FIGS. 1 and 2.

Introduced into each of the holes 2 is an insert 8 molded in a plastic, such as for example PVDF (polyvinylidene fluoride), or in a metallic material (aluminum for example). As a variant, this insert may be molded in situ. As may be more clearly seen in FIG. 3, each insert 8 has a peripheral wall 9 joined to a curved bottom 10. This insert is either made as one piece or is composed of several elements. It is elastically, or even plastically deformable, so as to allow it to be introduced into the hole.

The external face of the wall 9 is joined to the bottom 10 by a curved region 11, the shape of which allows it to match that of the concave region 5 of the hole 2. The curved region 11 is extended by a cylindrical wall 12 of small height, which is intended to bear against the cylindrical region 6 defining the hole 2, before terminating, after an inward step 13, in another cylindrical region 14.

The internal face of the wall 9 has, near the bottom 10, a peripheral recess 15, the rest of the internal face of the wall 9 having an internal thread 16.

Moreover, the wall 9 has, starting from its flat upper rim 17—which is intended to lie, in the mounting position, in the plane of the face 1b of the plate 1—four regularly spaced and relatively deep radial slots 18 extending as far as the vicinity of the bottom 10, which bottom may optionally be pierced.

The side wall 9 is thus divided into four "petals" by these slots 18, which, in combination with the recess at 15, give the insert 8 flexibility, the "petals" thus being able to bend inward in order to allow, by elastic or even plastic deformation, the insert 8 to be introduced into a hole 2; once the insert 8 has been introduced, the petals resume their initial position, matching the regions 5 and 6 that define the hole 2. Thus, the insert 8 is caught under the aforementioned bead. However, a space is formed in this position between the walls 7 and 14, making it easier for the insert 8 to be removed should this be necessary.

Depending on the applications, and especially in that intended in this example, it may be important to make the hole and its insert invisible from the side facing the user. For this purpose, a wetting agent is interposed at the interface between the internal side wall of the hole and the external wall of the hole in order to improve the surface appearance, such as for example a silicone wetting agent, or a lubricating agent possessing this property.

Once fitted, the insert 8 receives an element 18 for connecting the plate 1 to its support. This connecting element 19 ensures self-locking of the insert. The drawing shows only that part of the connecting element 19 which cooperates with the insert 8 and is formed by a rod, the end region 20 of which has a screw thread 20 for fastening the element 19 to the plate 1 by screwing. The opposite end of the rod 20 (which is therefore not shown) is designed to allow connection to the chosen support.

As a variant, the connecting element may consist of any kinematic chain for connecting a plate of brittle material to a support. Thus, this kinematic chain may include a ball joint, optionally extended by a rod, an articulation, a box, etc.

The glass plates 1 that have undergone a heat or chemical treatment (for example a toughening treatment) are prepared in the following manner: the plates 1 are firstly cut from untoughened glass; the holes 2 are machined at the intended places—in general at least two, and preferably three or four holes 2 made in each corner of the plate 1, for example in the case of the application to heating means—and then the heat or chemical treatment (in this example here, a toughening operation) is carried out on the plates 1. The concave region 5 of the side walls defining the holes 2 allows the stresses that develop within the glass during the toughening treatment to be distributed. In particular, the profile of this concave region, having the aforementioned part 5a of larger radius of curvature, ensures that toughening takes place without causing the glass to fracture in this region, thus avoiding having to scrap the plates 1.

Next, the inserts 8 are introduced into the respective holes 2. (As a variant, the inserts 8 may be molded in situ). As already indicated, this fitting of the inserts 8 is very easy because of their elasticity or even plasticity. The plates 1 may be delivered although they are already equipped with their inserts 8, which inserts do not project beyond the surface of the plates 1.

The connecting elements 19 are then fitted. This fitting is accomplished by screwing in the example shown.

A certain clearance is left between a hole 2 and the insert 8 received therein. This allows, on the one hand, easier fitting when mounting the connecting elements and, on the other hand, greater ease in absorbing the mechanical forces exerted on the plate 1 once it has been mounted, which forces may increase if the plate 1 were to be a plate forming part of a heating means and consequently obliged to undergo expansion during heating.

The invention as described above affords many advantages:
- the connection between the support and the plate requires a small number of parts;
- this connection is relatively insensitive to the manufacturing tolerances; and
- this connection is removable and can withstand relatively high mechanical forces.

It will of course be understood that the embodiment described above is in no way limiting and may give rise to any desirable modification without thereby departing from the scope of the invention.

The invention claimed is:

1. A glass plate and insert assembly comprising: a glass plate including a generally spherical hole having a flat circular bottom, a concave region, a cylindrical region and a frustoconical opening in a surface of the plate, a diameter of the concave region being greater than a diameter of the cylindrical region; a deformable insert having retaining walls forming a through bore with female threads, the walls having radially spaced petals which are inwardly bendable and spaced apart by slots therebetween, the petals each having an outer surface with an outwardly curved region and inward step; the curved region having a greater outer diameter than the inward step to allow the curved region to conform to the concave region, and allow the inward step to abut the cylindrical region, and a peripheral recess formed in a lower peripheral portion of the walls to increase flexibility of the petals; and a connecting element with male threads to threadably engage the female threads and thereby block inward flexing of the petals and lock the insert within the glass plate.

2. The assembly as claimed in claim 1, wherein the slots include three, four, or five slots.

3. The assembly as claimed in claim 1, wherein the connecting element expands the insert upon connection of the connecting element with the insert.

4. The assembly as claimed in claim 1, wherein the glass plate comprises a toughened, tempered, annealed, or mechanically reinforced glass.

5. The assembly as claimed in claim 1, including a wall cladding element, an interior furnishing, a partition, or a piece of furniture.

6. A method for manufacturing a glass plate and insert assembly, the method comprising: providing the glass plate and insert assembly, as claimed in claim 1, and positioning the insert within the hole and heat treating the glass plate.

* * * * *